United States Patent
Chai et al.

(10) Patent No.: US 8,294,326 B2
(45) Date of Patent: Oct. 23, 2012

(54) STATOR FOR AN ELECTRIC MOTOR

(75) Inventors: Ji Dong Chai, Shenzhen (CN); Bao Ting Liu, Shenzhen (CN); Wen Liang Li, Shenzhen (CN); Zhi Duan Shao, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 476 days.

(21) Appl. No.: 12/352,216

(22) Filed: Jan. 12, 2009

(65) Prior Publication Data
US 2009/0195112 A1  Aug. 6, 2009

(30) Foreign Application Priority Data
Jan. 11, 2008 (CN) .......................... 2008 1 0065046

(51) Int. Cl.
*H02K 1/06* (2006.01)
*H02K 1/12* (2006.01)

(52) U.S. Cl. ....... 310/216.086; 310/216.044; 310/254.1; 310/257

(58) Field of Classification Search ........... 310/216.086, 310/216.044, 216.058, 216.079, 216.113, 310/216.136, 254.1, 257
See application file for complete search history.

(56) References Cited

U.S. PATENT DOCUMENTS

| | | | |
|---|---|---|---|
| 781,957 A * | 2/1905 | Kishi ................... | 310/216.074 |
| 1,033,379 A * | 7/1912 | Burke ........................... | 310/433 |
| 1,115,947 A * | 11/1914 | Lincoln ......................... | 310/415 |
| 1,353,658 A * | 9/1920 | Kostko ..................... | 310/216.088 |
| 2,607,816 A * | 8/1952 | Ryder et al. ............ | 310/216.086 |
| 3,441,760 A * | 4/1969 | Collens .......................... | 310/91 |
| 4,466,182 A * | 8/1984 | Lamatsch et al. ............... | 29/596 |
| 5,729,072 A | 3/1998 | Hirano et al. | |
| 6,177,751 B1 * | 1/2001 | Suzuki et al. .................. | 310/269 |
| 7,042,130 B2 * | 5/2006 | Zepp et al. ............. | 310/216.102 |

(Continued)

FOREIGN PATENT DOCUMENTS
CN  2773977  4/2006

(Continued)

*Primary Examiner* — Quyen Leung
*Assistant Examiner* — Alex W Mok
(74) *Attorney, Agent, or Firm* — Muncy, Geissler, Olds & Lowe, PLLC

(57) ABSTRACT

A stator for an electric motor has a laminated stator core 10 formed from a plurality of stacked laminations, and a stator winding formed from a plurality of coils 20 wound on bobbins 30. The stator core 10 has a plurality of teeth 40 which extend radially and alternately spaced between and connected to circumferentially extending yokes 50. The yokes and the teeth are separately formed with each yoke 50 being a stack of yoke laminations 12 and each tooth 40 being a stack of tooth laminations 14. The teeth 40 are inserted through the bobbins 30 and arranged in a cylindrical form with each tooth 40 extending radially. Yokes 50 are then fixed between radially outer ends 144 of adjacent teeth to complete the radially outer portion of the stator core. Each tooth 40 has a radial location surface 144b which contacts an inner surface of the adjacent yokes 50. The yokes 50 and teeth 40 are fixed together by welding the yokes 50 to the outer ends 144 of the teeth 40.

20 Claims, 4 Drawing Sheets

U.S. PATENT DOCUMENTS

| | | | |
|---|---|---|---|
| 2002/0145359 A1 * | 10/2002 | Nishiyama et al. | 310/218 |
| 2004/0124734 A1 * | 7/2004 | Liao | 310/218 |
| 2005/0116575 A1 * | 6/2005 | Zepp et al. | 310/218 |
| 2005/0189840 A1 * | 9/2005 | Du et al. | 310/218 |
| 2005/0212377 A1 * | 9/2005 | Wang et al. | 310/259 |
| 2006/0125340 A1 * | 6/2006 | Nishiyama et al. | 310/218 |
| 2006/0226729 A1 * | 10/2006 | Du et al. | 310/218 |
| 2008/0191578 A1 * | 8/2008 | Evans | 310/217 |

FOREIGN PATENT DOCUMENTS

| | | |
|---|---|---|
| DE | 103 25 982 A1 | 12/2004 |
| DE | 102007013211 A1 | 10/2007 |
| JP | 8205485 | 8/1996 |
| JP | 2008035618 A * | 2/2008 |

* cited by examiner

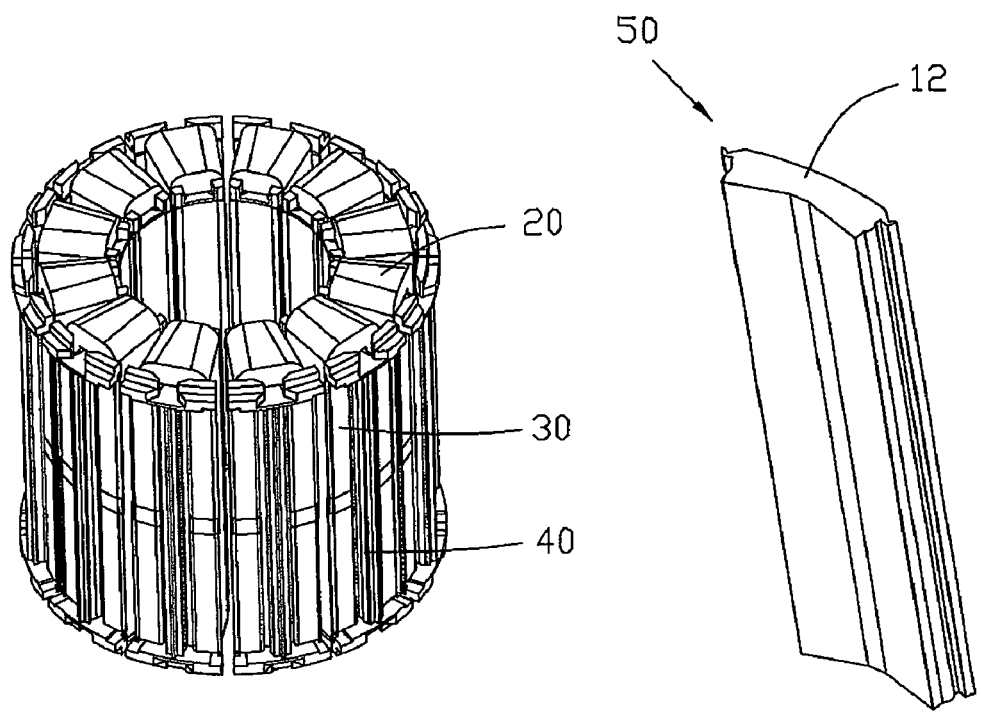
FIG. 3d
FIG. 3e
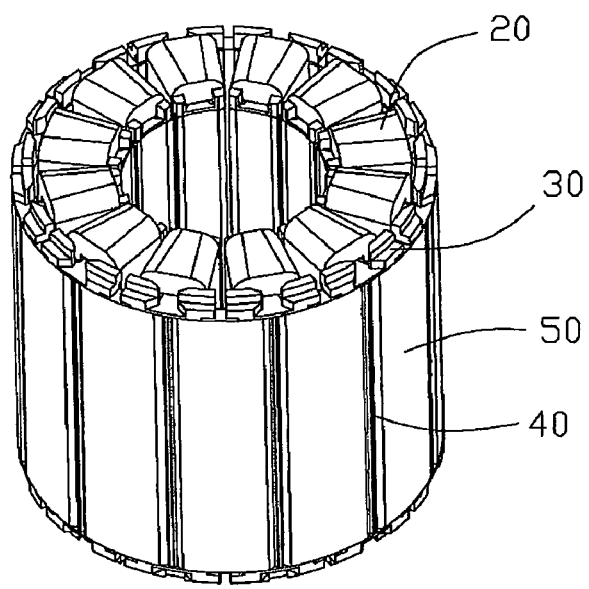
FIG. 3f

STATOR FOR AN ELECTRIC MOTOR

CROSS REFERENCE TO RELATED APPLICATIONS

This non-provisional patent application claims priority under 35 U.S.C. §119(a) from Patent Application No. 200810065046.6 filed in The People's Republic of China on Jan. 11, 2009.

FIELD OF THE INVENTION

The present invention relates to an electric motor and in particular to a stator for an electric motor, especially a servo motor.

BACKGROUND OF THE INVENTION

A servo motor is one example of a motor having a salient pole wound stator. Usually, the stator poles, known as teeth because of their appearance, extend radially with a radially inner surface forming the pole face which is a discontinuous cylindrical surface, which confronts the rotor across a small air gap. The servo motor is commonly used with an electronic controller to provide angular displacement or angular speed in response to control signals. The servo motor has the advantage of having a small volume and light weight, high output power and torque, and being easy to control.

FIG. 1 is a plan view of a laminated stator core of a typical servo motor. The stator core is formed by stacking together a plurality of stator laminations. The stator laminations each comprise a round yoke 1 and a plurality of teeth 3 being uniformly distributed and extending radially inward from the yoke 1. A stator winding (not shown in the figure) is wound around the teeth 3. In the above described stator, the material between the yoke 1 and teeth 3 can not be used, so the material utilization ratio is low. While winding the wires of the winding about the teeth, the winding tool needs to be shuttled continuously at the gap 5 between yoke 1 and teeth 3, and because of the limitation of the gap 5, the winding is very inconvenient and time-consuming. Further more, a comparative big gap must be left between the windings wound on two adjacent teeth 3, so as to let the winding tool to pass through the gap. The comparatively big gaps provided between the windings limit the slot coil ratio of the windings, thus the efficiency of the motor will be less than maximum. To allow the winding tool pass through, a comparatively big clearance 7 must also be provided between the ends of two adjacent teeth 3; however, the bigger the clearances 7, the bigger the fluctuation in the motor torque (cogging torque).

To overcome the disadvantages of the above mentioned stator lamination structure, it has been proposed to use split type stator laminations, such as the stator laminations formed from T-shape lamination units disclosed in U.S. Pat. No. 5,729,072. However, the stator core produced by such T-shape lamination units still has disadvantages of inconvenient winding methods, low material utilization ratio, etc.

SUMMARY OF THE INVENTION

Hence there is a desire for a stator which has better fill ratio and material usage.

This is achieved in the present invention by using a stator core having separate teeth and yokes, eliminating the need for space for the winding tool. The use of a winding bobbin improves assembly efficiency and the insulation rating between he winding and the stator core which is important for high voltage applications.

Accordingly, in one aspect thereof, the present invention provides a laminated stator core for a motor, comprising a plurality of stacked stator laminations, wherein the stator core comprises a plurality of yokes distributed circumferentially about a radially outer portion of the stator core and a plurality of teeth extending in a radial direction from an inner portion to the outer portion of the stator core; the yokes and teeth being separately formed with each yoke being a stack of yoke laminations and each tooth being a stack of tooth laminations, and each tooth is fixed between two adjacent yokes at an outer end thereof.

According to a second aspect, the present invention also provides a stator for a motor, comprising a laminated stator core having a plurality of stacked stator laminations forming a plurality of radially extending teeth and a stator winding formed by coils disposed about the teeth, wherein the stator core comprises a plurality of yokes distributed circumferentially about a radially outer portion of the stator core and a plurality of teeth extending in a radial direction from an inner portion to the outer portion of the stator core; the stator laminations include yoke laminations and tooth laminations, the yokes and teeth being separately formed with each yoke being a stack of yoke laminations and each tooth being a stack of tooth laminations, each tooth is fixed between two adjacent yokes at an outer end thereof and each coil is wound about a bobbin which accommodates the respective tooth.

Preferably, each tooth is provided with radial locating surfaces lying against an inner surface of adjacent yokes.

Preferably, a detent structure is provided between each tooth and yoke interface, so as to limit movement of the teeth relative to the yokes in the radial direction.

Preferably, the detent structure includes a recess formed in one of the tooth and the yoke and a protrusion formed on the other one of said tooth and said yoke, the protrusion being interlocked in the recess so as to limit movement of the tooth relative to the yoke in the radial direction.

Preferably, each yoke is elongate having two ends, the ends having connection points and the connection points are welded to the end of an adjacent tooth.

Preferably, the connection points of two adjacent yokes are connected to the end of the included tooth by a single weld.

According to a third aspect, the present invention also provides a method of forming a stator for a motor having a laminated stator core and a stator winding formed by coils disposed about teeth of the stator core, the method comprising the steps of: 1) forming the stator winding by winding each coil around a wire bobbin; 2) forming the teeth of the stator core by stacking together a plurality of teeth laminations and inserting the teeth into respective wound bobbins; 3) arranging the teeth and bobbins into a cylindrical shape with the teeth extending in a radial direction; 4) forming a plurality of yokes by stacking together a plurality of yoke laminations, and placing the yokes respectively between the outer ends of adjacent teeth to form an outer portion of the stator core with alternating teeth and yokes; and 5) fixing the teeth to the yokes by welding connection points on the yokes to the ends of the adjacent teeth.

Preferably, two yokes are joined to the radially outer end of a single included tooth by a single weld.

Preferably, the method also includes the steps of: forming a radial locating surfaces on each tooth adjacent the radially outer end of the tooth and retaining the radial locating surfaces in contact with an inner surface of the adjacent yokes while welding the adjacent yokes to the tooth.

Preferably, the method further includes the steps of: forming a detent configuration between each tooth and each adjacent yoke in the form of a recess and projection and engaging the recess with the projection to fix the radial location of the teeth with respect to the yokes.

The present invention allows the coils to be wound on a winding bobbin before assembling, so the winding is convenient in that the winding operation of each coil does not interfere with adjacent yokes and teeth. There is no need to keep comparatively large gaps between adjacent coils for the winding tool, so the winding slot coil ratio and the efficiency of the motor can be increased. There is no need to keep a comparatively large clearance between the inner ends of adjacent teeth for the winding tool to pass through, thus allowing cogging torque to be reduced. By separating the teeth and yokes the blank layout can be very compact allowing a high material utilization ratio.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

FIG. 3a to FIG. 3f are schematic diagrams of various steps in the forming of a stator for a servo motor according to the preferred embodiment of the present invention.

DESCRIPTION OF THE PREFERRED EMBODIMENT

Figure 1:
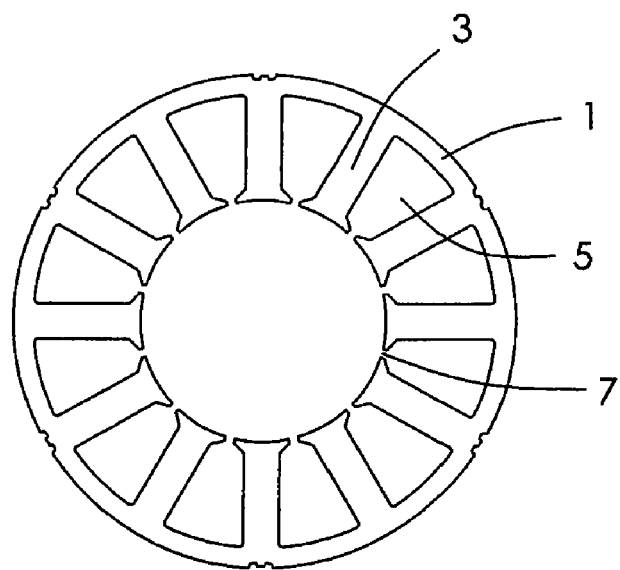
FIG. 1 is a plan view of a laminated stator core of a servo motor of conventional art.
Figure 2:
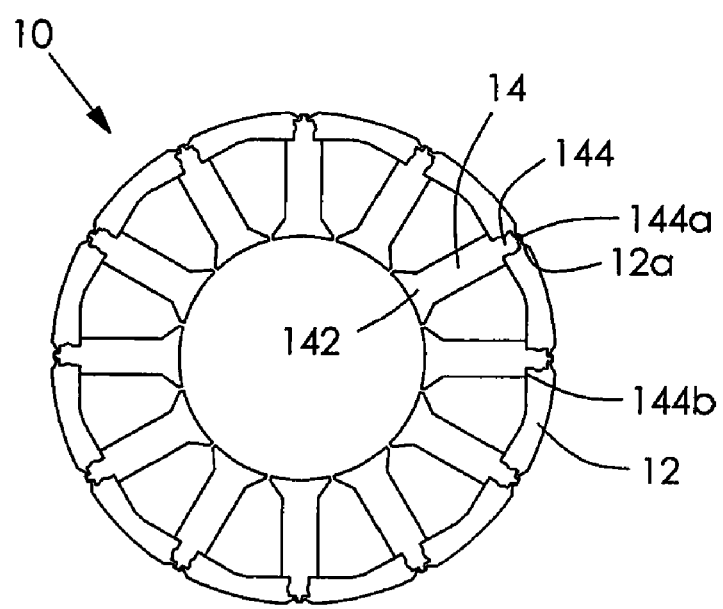
FIG. 2 is a plan view of a laminated stator core for a servo motor according to the preferred embodiment of the present invention.

FIG. 2 is a plan view of a stator core lamination for a servo motor. The stator core 10 is a laminated structure with each layer of the stator lamination comprising a plurality of teeth lamination 14 and a plurality of yoke laminations 12 which extend between adjacent teeth laminations 14. Each yoke 50 as shown in FIG. 3e is formed by stacking together a plurality of yoke laminations 12 and each tooth 40 as shown in FIG. 3b is formed by stacking together a plurality of tooth laminations 14. The yoke laminations 12 are elongate and extend in the circumferential direction of the stator core 10 to form a radially outer portion of the core. The teeth laminations 14 extend in the radial direction. The yokes 50 and teeth 40 are thus separately formed. When assembled the yokes support the teeth and also provide the magnetic flux path between the teeth. One yoke 50 extends between each pair of adjacent teeth 40 and one tooth 40 is located between each pair of adjacent yokes 50. Each tooth lamination 14 comprises an inner end 142 and an outer end 144. The inner end 142 forms the pole face, a discontinuous cylindrical surface which confronts the rotor. The outer end 144 of each tooth lamination 14 is fixed in the gap between two adjacent yokes laminations 12. Each outer end 144 is provided with a radial locating surface 144b lying against inner surfaces of two adjacent yokes 12. This abutment between the teeth and the yokes sets the radial position of the teeth 40. A detent structure is formed between each tooth/yoke interface. The detent comprises a recess 12c or 144c formed on either the tooth or the yoke and a matching projection 144d or 12b formed on the other of the tooth or yoke (as more clearly shown in FIGS. 4a and 4b). This detent is used to temporarily hold the teeth and yokes together during assembly of the stator by restricting movement between the teeth and the yokes especially radial movement of the teeth with respect to the yokes. Then the stator is finally assembled the teeth are fixed to the yokes, preferably by welding. To this end, each yoke lamination has a small projection 12a at each end on an outer edge thereof. These projections 12a form a connection point which contact or confront a small projection 144a on the radially outer end on the teeth. The connection points and projections provide a zone whereby a single weld can fix together two yokes and the included tooth.

The stator winding is formed by a number of individual coils connected together. Each coil is wound on a respective coil bobbin 30. The bobbin 30 is optionally a plastics material injection molded part thereby further insulating the coil from the stator core. The bobbin has a passage through which one of the teeth 40 extends. Thus each bobbin 30 is fitted one of the teeth 40 to form the stator pole.

Figure 3A:
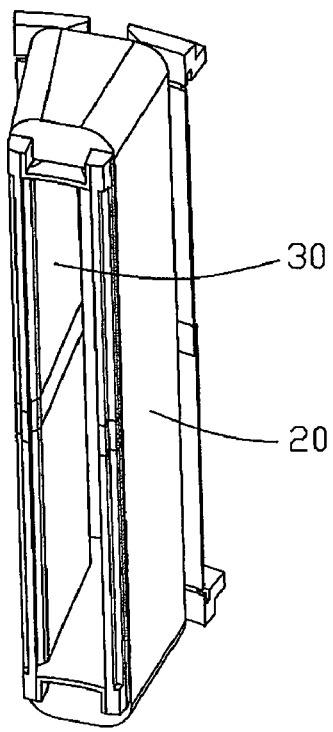
Figure 3B:
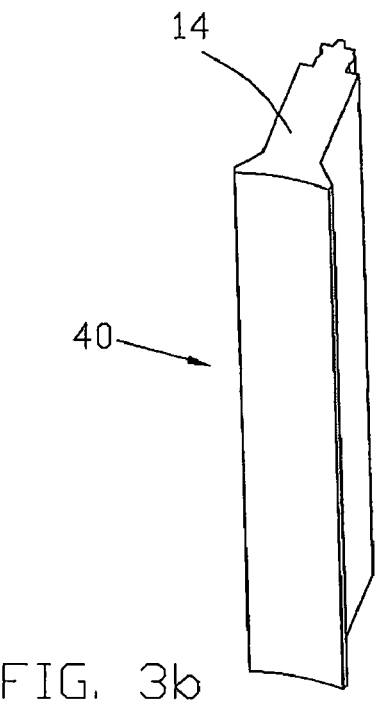
Figure 3C:
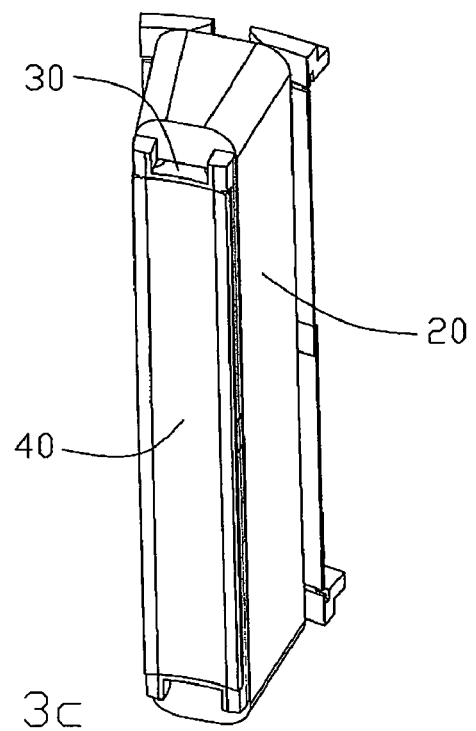

Referring now to FIGS. 3a to 3f, the method of assembling the stator will be described. First, as shown in FIG. 3a, magnet wire is wound around the bobbin 30 to form the coil 20. A tooth 40, being a stack of tooth laminations 14 as shown in FIG. 3b, is inserted into the bobbin 30 to form the wound tooth combination as shown in FIG. 3c.

A plurality of the wound tooth combinations are arranged into a cylindrical shape, as shown in FIG. 3d. Yokes 50, being a stack of yoke laminations 12 as shown in FIG. 3e, as inserted or wedged into the gaps between the outer ends of adjacent teeth 40. The yokes being pressed against the radial limiting surfaces and the projections and recesses of the detent are interlocked to hold the stator core together and prevent movement between the teeth and yokes, especially in the radial direction. Once all the yokes 50 have been fitted to the teeth 40, as shown in FIG. 3f, the yokes are permanently fixed to the teeth by welding along the connection points.

Figure 4A:
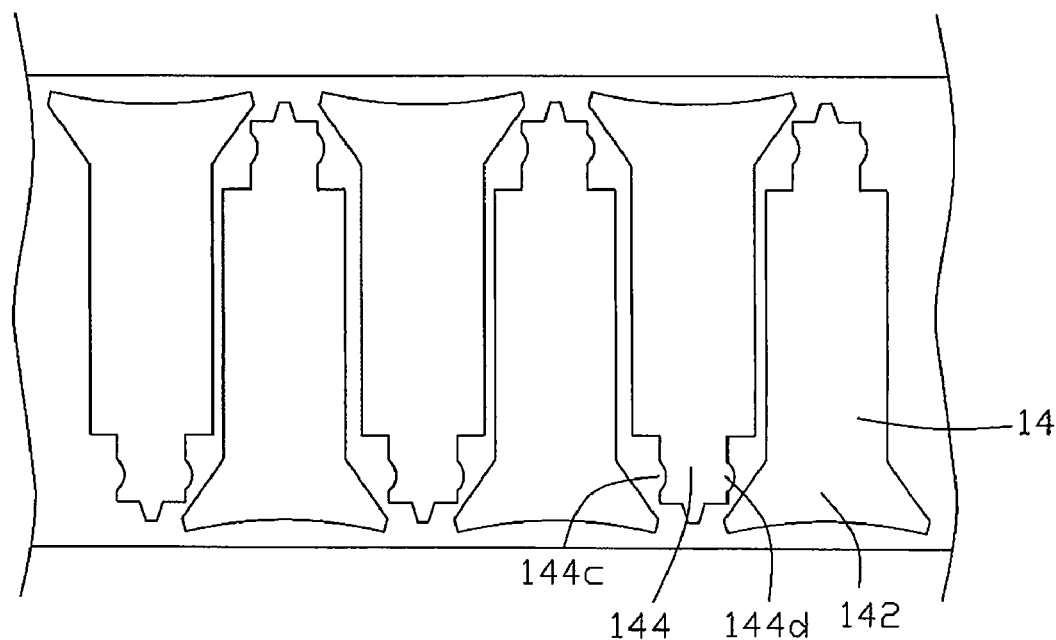
FIG. 4a and FIG. 4b are blank layout schematic diagrams of the teeth and the yokes.
Figure 4B:
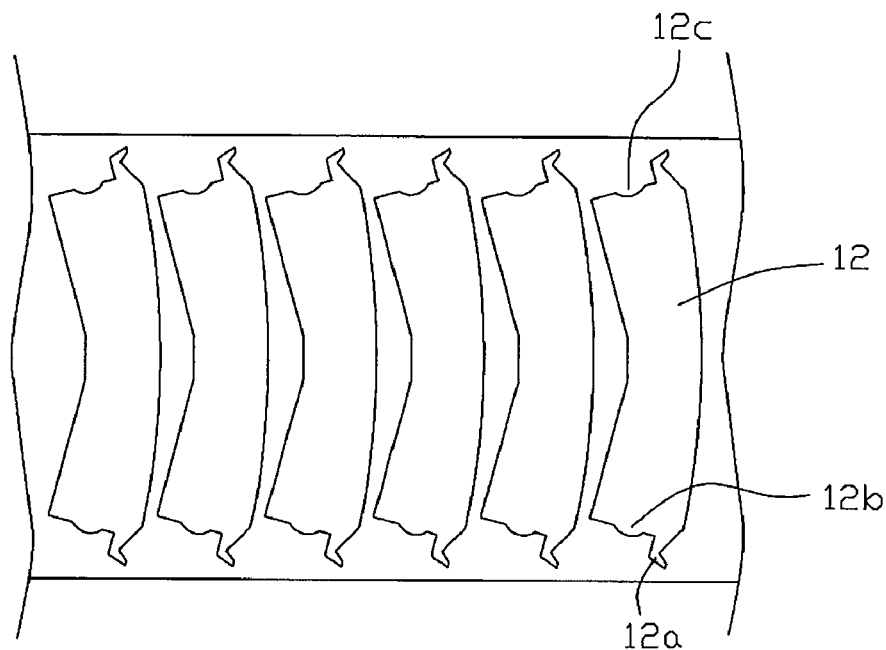

FIG. 4a and FIG. 4b are blank layout schematic diagrams for the tooth laminations 14 and for the yoke laminations 12. As shown in FIG. 4a, the blank layout schematic diagram for the tooth laminations 14, adjacent tooth laminations 14 are arrayed inversely, that is, the inner end 142 of each tooth lamination 14 is close to the outer end 144 of the adjacent tooth laminations 14. As shown in FIG. 4b, the yoke laminations 12 as placed side by side. As can be appreciated from FIGS. 4a and 4b, the layout is compact with little wasted material between the laminations, so the material utilization ratio is high. In the embodiment described, the material utilization ratio for the stator laminations can be over 63%.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A stator core, comprising a plurality of yokes distributed circumferentially about a radial outer portion of the stator core and a plurality of teeth extending in a radial direction from an inner portion to the outer portion of the stator core, the yokes and the teeth being separately formed, each tooth being included between two adjacent separate yokes, each tooth having an outer end with two side edges and an outer edge connecting the two side edges, two adjacent separate yokes being respectively in contact with an included tooth at the two side edges, wherein each tooth further has a projection outwardly extending from the outer edge and the two adjacent separate yokes are fixed to the included tooth at the projection.

2. The stator core of claim 1, wherein the maximum circumferential dimension of the projection is smaller than the maximum circumferential dimension of the outer end such that the two adjacent separate yokes are fixed to the included tooth at the projection by a single weld.

3. The stator core of claim 1, wherein each tooth has radial locating surfaces lying against inner surfaces of said adjacent separate yokes.

4. The stator core of claim 3, wherein the outer end of each tooth outwardly extends from the radial locating surfaces.

5. The stator core of claim 4, wherein a detent structure is provided between each of the side edges of each tooth and the respective adjacent yoke so as to limit movement of the tooth relative to the yokes in the radial direction.

6. The stator core of claim 5, wherein the detent structure includes a recess formed in one of the tooth and the yoke and a protrusion formed on the other one of said tooth and said yoke, the protrusion being interlocked in the recess.

7. The stator core of claim 1, wherein each yoke is elongate having two ends which have projections formed at the radial outer edge thereof, the projections forming connecting points, two adjacent connecting points of every two adjacent yokes being fixed to the projection of the respective included tooth.

8. The stator core of claim 7, wherein the two adjacent connecting points of every two adjacent yokes are fixed to the projection of the respective included tooth by a single weld.

9. A stator for an electric motor, comprising a stator winding formed by coils and a stator core having a plurality of yokes distributed circumferentially about a radial outer portion of the stator core and a plurality of teeth extending in a radial direction from an inner portion to the outer portion of the stator core, the yokes and the teeth being separately formed with each yoke being a stack of yoke laminations and each tooth being a stack of tooth laminations, each tooth being included between two adjacent separate yokes, each coil being wound about a respective tooth, each tooth having an outer end with two side edges and an outer edge connecting the two side edges, two adjacent separate yokes being respectively in contact with an included tooth at the two side edges, wherein each tooth further has a projection outwardly extending from the outer edge and the two adjacent separate yokes are fixed to the included tooth at the projection.

10. The stator of claim 9, wherein the maximum circumferential dimension of the projection is smaller than the maximum circumferential dimension of the outer end such that the two adjacent separate yokes are fixed to the included tooth at the projection by a single weld.

11. The stator of claim 9, wherein each tooth has radial locating surfaces lying against inner surfaces of said adjacent separate yokes.

12. The stator of claim 9, wherein the outer end of each tooth outwardly extends from the radial locating surfaces.

13. The stator of claim 12, wherein a detent structure is provided between each of the side edges of each tooth and the respective adjacent yoke so as to limit movement of the tooth relative to the yokes in the radial direction.

14. The stator of claim 13, wherein the detent structure includes a recess formed in one of the tooth and the yoke and a protrusion formed on the other one of said tooth and said yoke, the protrusion being interlocked in the recess.

15. The stator of claim 9, wherein each yoke is elongate having two ends which have projections formed at the radial outer edge thereof, the projections forming connecting points, two adjacent connecting points of every two adjacent yokes being fixed to the projection of the respective included tooth.

16. The stator of claim 15, wherein the two adjacent connecting points of every two adjacent yokes are fixed to the projection of the respective included tooth by a single weld.

17. A method of forming the stator of claim 9, comprising:
 winding the coils about respective bobbins;
 forming the teeth of the stator core by stacking together the teeth laminations;
 inserting the teeth into respective bobbins;
 arranging the teeth with wound bobbins into a cylindrical shape with the teeth extending in a radial direction;
 forming the yokes by stacking together the yoke laminations;
 placing the yokes respectively between the outer ends of adjacent teeth to form the outer portion of the stator core with alternating teeth and yokes; and
 fixing each tooth to the two adjacent separate yokes at the projection.

18. The method of claim 17, wherein each tooth is fixed to the two adjacent separate yokes at the projection by a single weld.

19. The method of claim 18, further including the steps of:
 forming radial locating surfaces on each tooth adjacent the outer end, and retaining the radial locating surfaces in contact with the adjacent yokes while welding the tooth to the adjacent yokes.

20. The method of claim 17, further including the step of:
 forming a detent structure between each of the side edges of each tooth and the respective adjacent yoke in the form of a recess and a projection and interlocking the recess with the projection.

* * * * *